(12) United States Patent
Yanaka

(10) Patent No.: US 6,816,059 B2
(45) Date of Patent: Nov. 9, 2004

(54) ANTI-THEFT SYSTEM FOR MOVING OBJECT

(75) Inventor: Akihiro Yanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 563 days.

(21) Appl. No.: 09/748,192

(22) Filed: Dec. 27, 2000

(65) Prior Publication Data

US 2001/0009394 A1 Jul. 26, 2001

(30) Foreign Application Priority Data

Jan. 21, 2000 (JP) ........................................ 2000-012854

(51) Int. Cl.$^7$ ............................ H04B 1/00; B60R 25/10; B60R 25/00; B60R 24/04
(52) U.S. Cl. ................................ 340/5.72; 340/426.11; 307/10.2; 307/10.3; 307/10.4; 307/10.5
(58) Field of Search ................................ 340/5.72, 5.2, 340/5.6, 5.64, 426.11, 426.13, 426.16, 426.17; 307/10.2, 10.3, 10.4, 10.5; 701/32

(56) References Cited

U.S. PATENT DOCUMENTS

| | | | | |
|---|---|---|---|---|
| 5,596,317 A | * | 1/1997 | Brinkmeyer et al. | ........ 340/5.72 |
| 5,675,490 A | * | 10/1997 | Bachhuber | .................. 340/5.72 |
| 5,808,372 A | * | 9/1998 | Schwegler et al. | ........ 340/5.72 |
| 5,818,330 A | * | 10/1998 | Schweiger | ............. 340/426.13 |
| 6,611,193 B1 | * | 8/2003 | Weigl et al. | ................... 340/5.2 |
| 2001/0011942 A1 | | 8/2001 | Yamamoto et al. | |

FOREIGN PATENT DOCUMENTS

| | | |
|---|---|---|
| DE | 196 34 623 C1 | 1/1998 |
| DE | 197 52 217 A1 | 6/1999 |
| EP | 0 773 148 A1 | 5/1997 |
| EP | 0 893 315 A2 | 1/1999 |
| JP | 5-330402 | 12/1993 |
| JP | 8-113112 | 5/1996 |
| JP | 10-194087 | 7/1998 |
| JP | 10-244853 | 9/1998 |
| WO | WO 9305987 A1 * | 4/1993 ........... B60R/25/00 |

* cited by examiner

Primary Examiner—Brian Zimmerman
Assistant Examiner—Clara Yang
(74) Attorney, Agent, or Firm—Oliff & Berridge, PLC

(57) ABSTRACT

In an immobilizer controller, a key-side identifying information stored in a key is collated (compared) with an immobilizer-side identifying information stored in the immobilizer controller. In a shift controller, the key-side identifying information is collated with a shift-lock-side identifying information stored in the shift controller. If the identifying informations do not coincide with each other in at least one of the immobilizer controller and the shift controller, neither a fuel-injection-control permitting command nor a shift-lock-cancellation permitting command is output. An engine is maintained in its inoperative state, and a transmission is maintained in a state where rotation of a driving-torque transmitting shaft is prevented. If the identifying informations coincide with each other in the immobilizer controller, it is possible to reinforce security in comparison with the case where the fuel-injection-control permitting command and the shift-lock-cancellation permitting command are output.

10 Claims, 7 Drawing Sheets

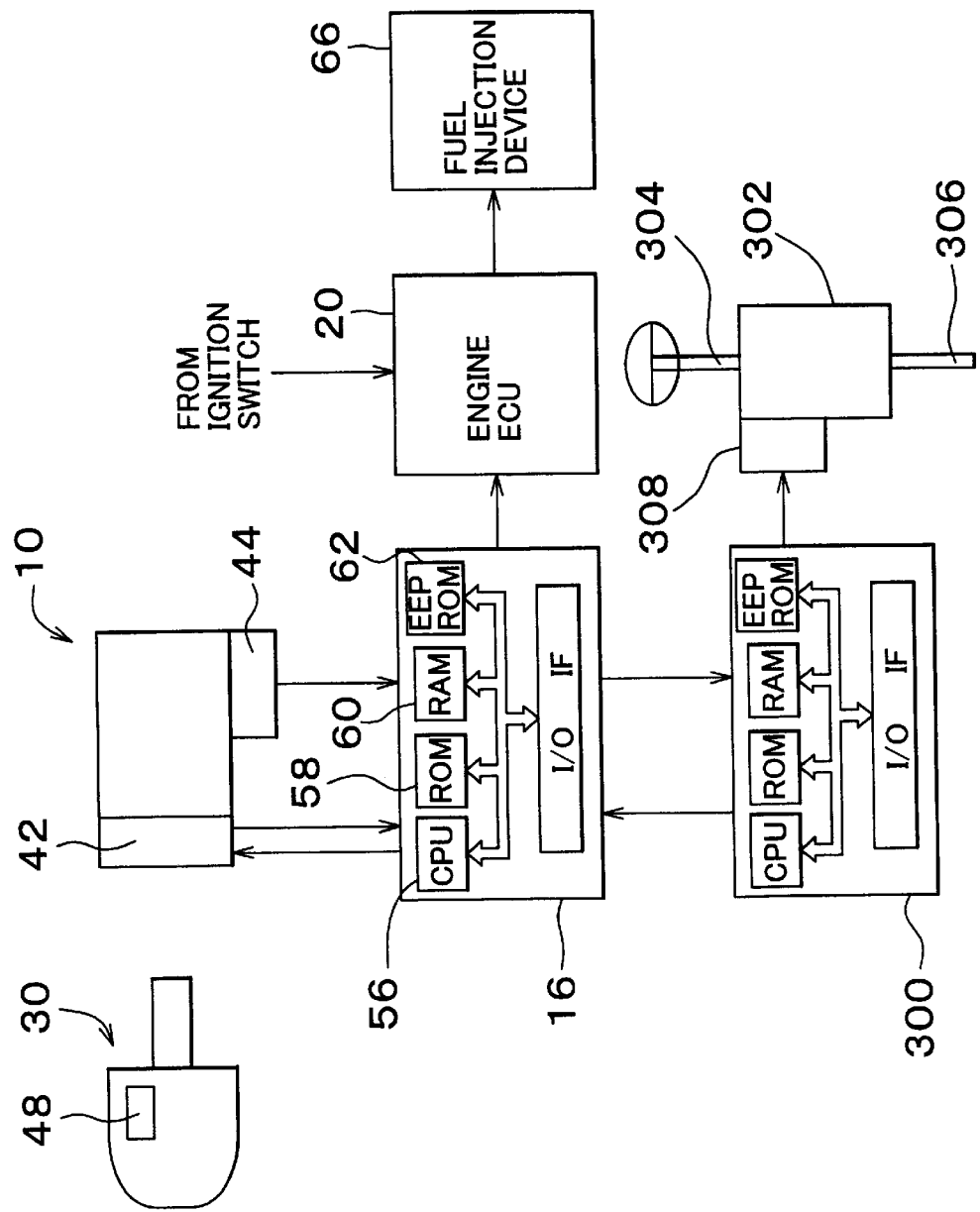

ANTI-THEFT SYSTEM FOR MOVING OBJECT

INCORPORATION BY REFERENCE

The disclosure of Japanese Patent Application No. 2000-012854 filed on Jan. 21, 2000, including the specification, drawings and abstract is incorporated herein by reference in its entirety.

BACKGROUND OF THE INVENTION

1. Field of the Invention

The invention relates to an anti-theft system for a moving object.

2. Description of Related Art

Japanese Patent Application Laid-Open No. 10-244853 discloses an example of an anti-theft system for a moving object such as a vehicle. The anti-theft system disclosed in this publication includes a plurality of lock devices, collators and a lock-device controller. The lock devices are included in the moving object and can be switched between their locked states, where operation of a plurality of components required to move the moving object (the components required to move the moving object will hereinafter be referred to simply as mobile-purpose devices) is prohibited, and their unlocked states, where operation of the mobile-purpose devices is permitted. The collators collate (i.e., compare) identifying information in the moving object and a portable object. The lock-device controller maintains the locked devices in their locked states if identifying informations do not coincide with each other in one of the collators. In the anti-theft system described in this publication, the lock devices are maintained in their locked states if the identifying informations do not coincide with each other in one of the collators, and all the lock devices are unlocked if the identifying informations coincide with each other in one of the collators.

In this manner, according to the anti-theft system described in this publication, all the lock devices are unlocked if the identifying informations coincide with each other in one of the collators. Thus, it is impossible to guarantee sufficient security.

SUMMARY OF THE INVENTION

It is an object of the invention to improve the security of an anti-theft system for a moving object.

An anti-theft system for a moving object according to a first aspect of the invention includes a lock device, a plurality of collators, and a lock-device controller. The lock device is included in the moving object and can be switched between a locked state where operation of a component required to move the moving object is prohibited, and its unlocked state where operation of the component is permitted. The plurality of collators collate (i.e., compare) identifying informations of the moving object and a portable object. The lock-device controller maintains the lock device in its locked state if the identifying informations do not coincide with each other in any of the collators.

In the aforementioned anti-theft system, a plurality of collators are provided, and identifying informations are collated with each other in each of the collators. Therefore, it is possible to reinforce security in comparison with the case where identifying informations are collated with each other in only one of the collators. This technique is acceptable as long as only one lock device is included in the aforementioned anti-theft system. However, a plurality of lock devices may be provided and maintained in their locked states if the identifying informations do not coincide with each other in at least one of the collating devices. In this case, it becomes possible to further reinforce security.

The lock device can be switched between its locked state where operation of the mobile-purpose device (i.e., the component) is prohibited and its unlocked state where operation of the mobile-purpose device is permitted. The lock device may be designed to prohibit or permit operation of the mobile-purpose device either through hardware (mechanically) or through software. In the latter case, for example, a controller that controls the mobile-purpose device is provided with a lock portion that can be switched between its locked state where control of the mobile-purpose device is prohibited and its unlocked state where control of the mobile-purpose device is permitted. Even if the lock portion has been put into its unlocked state where control of the mobile-purpose device by the controller is permitted, control of the mobile-purpose device by the controller is not always started immediately. In some cases, the control is started if a predetermined condition has been satisfied.

The portable object is normally carried by the driver of the moving object. For example, the portable object can be a key for permitting the starting of the driving source of the moving object. An identifying information stored in the portable object (hereinafter referred to as the portable-object-side identifying information) is read by the moving object and collated with an identifying information stored in the moving object (hereinafter referred to as the moving-object-side identifying information). The portable-object-side identifying information is read either in a contact state where the portable object is in physical contact with the moving object or in a non-contact state where the portable object is out of physical contact with the moving object. In any case, the portable-object-side identifying information is often read through communication between the portable object and the moving object. A plurality of communication devices may be provided separately for the collators, or a single communication device may commonly be provided for the collators.

The identifying informations in the moving object and in the portable object coincide either in a case where the portable-object-side identifying information is identical to the moving-object-side identifying information or in a case where a predetermined relation between that information is established. Furthermore, the lock-device controller may either be formed together with at least one of the collators or may be provided separately from the collators.

The lock-device controller may maintain the lock device in its locked state if the identifying informations do not coincide with each other in at least one of the collators.

If the lock device is maintained in its locked state in the case where the identifying informations do not coincide with each other in at least one of the collators, it is possible to reinforce security.

An anti-theft system for a moving object according to a second aspect of the invention includes a plurality of lock devices, a plurality of collators and a lock-device controller. The plurality of lock devices are included in the moving object and can be switched between locked states where operation of a plurality of components required to move the moving object is prohibited and unlocked states where operation of the components is permitted. The plurality of collators collate identifying informations of the moving object and a portable object. The lock-device controller controls at least one of the lock devices based on collation results in two or more of the collators.

In the aforementioned anti-theft system, the lock devices are controlled based on the collation results of two or more of the collators. It is possible to reinforce security in comparison with the case where the lock devices are controlled based on the collation result of only one collator.

The lock-device controller may maintain all the lock devices in their locked states if the identifying informations do not coincide with each other in at least one of the collators.

If the identifying informations do not coincide with each other in all the collators, none of the lock devices are unlocked. Therefore, it becomes possible to reinforce security.

The collators may be provided so as to correspond in number to the number of lock devices respectively.

In the aforementioned aspect, the anti-theft system may be constructed such that one of the lock devices is a first lock device that can be switched between its locked state where operation of a driving source of the moving object is prohibited, and its unlocked state where operation of the driving source is permitted. Another one of the lock devices can be a second lock device that is required to move the moving object and can be switched between its locked state where operation of components other than the driving source is prohibited, and its unlock state where operation of the components is permitted. The lock-device controller maintains, if the identifying informations do not coincide with each other in at least one of the collators, both the first lock device and the second lock device in their locked states.

If the identifying informations do not coincide with each other in at least one of the collators, both the first lock device and the second lock device are maintained in their locked states. Both the first lock device and the second lock device are lock devices for the mobile-purpose devices. Therefore, if these two lock devices are maintained in their locked states, it is very difficult to move the moving object.

For example, the mobile-purpose device other than the driving source corresponds to a driving-force transmitting device, a steering device, a braking-cancellation device and an unlock device for a member (e.g., a door) that opens and closes and is provided at the entrance of the moving object.

The anti-theft system may include an abnormality detector that detects an abnormality in at least one of the lock devices, and the lock-device controller may maintain, if the abnormality detector has detected an abnormality, all the lock devices except the abnormal lock device in their locked states.

In the aforementioned anti-theft system, the abnormality detector detects an abnormality of at least one of the lock devices. If the lock device is not in normal operation, the lock device is judged to be abnormal. For example, the abnormality of the lock device corresponds to a case where the lock device itself is abnormal, a case where the lock device itself is normal but unable to perform its lock function properly, and the like. For example, this includes a case where a connecting portion between the lock device and the lock-device controller (e.g. a signal line) has been cut, a case where a power line for connecting the lock device with a battery of an electrically-operated actuator included therein has been cut, a case where a connecting portion between the lock device and the mobile-purpose device has been damaged, and the like. These cases can be detected, for example, by determining whether two or more of the operation state of the lock device, the operation state of the mobile-purpose device and the control command of the lock-device controller establish a predetermined relation.

The abnormality detector may detect an abnormality in the second lock device.

If it is detected that the second lock device is abnormal, the first lock device is maintained in its locked state. Because the first lock device can lock the operation of the driving source of the moving object, it is difficult to move the moving object if the first lock device is maintained in its locked state.

The second lock device may include at least one of a transmission lock device, a steering lock device, and a brake cancellation lock device. The transmission lock device switches a driving-torque transmitting device for transmitting a driving torque of the driving source of the moving object between its transmission state where the driving torque can be transmitted, and its non-transmission state where the driving torque cannot be transmitted. The steering lock device switches a steering device for changing the moving direction of the moving object based on operation of a steering member by the driver between its unsteerable state where the moving direction cannot be changed based on the operation, and its steerable state where the moving direction can be changed. The braking cancellation lock device switches a braking-force canceling device for canceling a braking force applied to the moving object to permit the moving of the moving object between its cancelable state where the braking force can be canceled and its uncancelable state where the braking force cannot be canceled.

The driving-torque transmitting device is switched through operation of the transmission lock device between its transmission state where the driving torque of the driving source can be transmitted, and its non-transmission state where the driving torque of the driving source cannot be transmitted. For example, the transmission lock device can be constructed as a rotation lock device that can be switched between its rotation preventing state where rotation of the driving-torque transmitting shaft for transmitting a driving torque of the driving source (the output shaft of the driving-torque transmitting device) is prevented and its rotation permitting state where rotation of the driving-torque transmitting shaft is permitted.

To be more specific, the rotation lock device may be designed to include a parking lever and a lever-moving device. The parking lever has a serration provided in an outer peripheral portion of the driving-force transmitting shaft and a projection provided on the body of the driving-force transmitting device and engageable in grooves of the serration. The parking lever is movable between its engagement position where the projection is in engagement with the serration and its disengagement position where the projection is out of engagement with the serration. The lever-moving device moves the parking lever. If the parking lever has been moved from its engagement position to its disengagement position through operation of the lever-moving device, the rotation lock device is switched from its rotation preventing state where rotation of the driving-torque transmitting shaft is prohibited, to its rotation permitting state where the rotation is permitted. Then the driving-torque transmitting device is switched from its non-transmission state to its transmission state.

If the moving object is a vehicle, the transmission is an example of the driving-torque transmitting device, and the parking device, which can be switched between its rotation preventing state where rotation of the output shaft of the transmission is prevented, and its rotation permitting state where the rotation is permitted, corresponds to the transmission lock device. If the operating position of the shifting device is the parking position, the parking device is maintained in its rotation preventing state. If the operating position of the shifting device is a position other than the parking position, the parking device is maintained in its rotation permitting state. The shifting device is provided with a shift lock device that can be switched between its shift lock state where the switching of the operating position from the parking position to a position other than the parking position is prohibited, and its shift unlock state where the switching of the operating position from the parking position to a position other than the parking position is permitted. The vehicle may be either of a type wherein the parking device and the shifting device are mechanically coupled to each other or of a type wherein those devices are not mechanically coupled to each other.

In the case where the parking device and the shifting device are mechanically coupled to each other, if the shift lever designed as the shifting member in the shifting device has been shifted from the parking position to a position other than the parking position, the parking lever is thereby moved from its engagement position to its disengagement position. Rotation of the driving-torque transmitting shaft is permitted, and the transmission is switched to its transmission state. In this case, the lever-moving device is operated when the driver operates the shift lever. The operation of the shift lever is transmitted to the lever-moving device through a coupling mechanism for coupling the shifting device to the parking device.

On the other hand, if the parking device and the shifting device are not mechanically coupled to each other, the operating position of the shifting device is detected by a sensor, and an information indicative of the operating position is supplied to a transmission controller constructed mainly of a computer. If the operating position has been switched from the parking position to a position other than the parking position, the lever-moving device is operated based on a command from the transmission controller, and the parking lever is moved from its engagement position to its disengagement position. The lever-moving device may be operated by an electric actuator such as an electric motor and a piezoelectric element. Alternatively, the lever-moving device may be an electro-hydraulic moving device including a fluid pressure cylinder such as a liquid pressure cylinder and a control valve capable of controlling the fluid pressure therein through control of the state of excitation of a solenoid.

In either case, the parking device is operated if the shift position (the operating position) of the shifting device has been switched from the parking position to a position other than the parking position. Therefore, the shift lock device can be regarded as corresponding to the transmission lock device.

If the shift lock device prevents the shifting device from being switched from the parking position to a position other than the parking position, the transmission as the driving-torque transmitting device, is maintained in its non-transmission state where no driving torque is transmitted. Therefore, in this sense, the shift lock device can also be regarded as corresponding to the transmission lock device.

In addition, the transmission controller, which is constructed mainly of an electromagnetic control valve for controlling the transmission (brakes, clutches and the like in the transmission) and a computer for controlling the electromagnetic control valve, can also be regarded as corresponding to the transmission lock device. By controlling the brakes and the clutches, it becomes possible to maintain the transmission in its non-driving transmission state where the driving torque of the driving source is not transmitted to the driving-torque transmitting shaft.

The steering lock device switches the steering device between its unsteerable state where the moving direction of the moving object cannot be changed based on the operation of the steering member, and its steerable state where the moving direction of the moving object can be changed. For example, the steering lock device may be designed to prohibit and permit either operation of the steering member itself or transmission of operation of the steering member to a moving-direction changing device for changing the moving direction of the moving object.

In the case where the moving object is a vehicle, a device for converting rotation applied to the steering wheel into a rectilinear motion of a tie rod and turning the wheels corresponds to the steering device. The steering lock device may be designed to prohibit and permit either rotational operation of the steering wheel itself or transmission of a steering torque applied to the steering wheel to a steering transmission member. For example, the steering-torque transmitting member may include an engagement portion (e.g. a pinion) of a steering shaft (e.g. an intermediate shaft) which engages a kinetic conversion device (a steering gear device) for converting rotation of the steering shaft into rectilinear motion. The steering lock device may also be designed to prevent rotation of the steering-torque transmitting member when a steering torque applied to the steering wheel is prevented from being transmitted to the steering-torque transmitting member. On the other hand, in the case where the steering device includes a power steering device, the steering controller for controlling actuators included in the power steering device, such as an electric motor, a fluid pressure cylinder and the like, can also be regarded as corresponding to the steering lock device. If these actuators have been put into their inoperative states, it becomes impossible to turn the wheels in accordance with the operation of the steering wheel.

The braking cancellation lock device switches the braking cancellation device between its cancelable state where it is possible to cancel a braking force, and its uncancelable state where it is impossible to cancel a braking force.

In the case where the moving object is a vehicle, for example, if the parking brake assumes its braking state where a frictional member provided so as to be unrotatable relative to the vehicle body is pressed against a rotating body rotating together with the wheels, rotation of the wheels is restrained, so that it becomes difficult for the vehicle to travel. Accordingly, if the braking cancellation device for the parking brake is maintained in its braking uncancelable state by the braking cancellation lock device, it becomes impossible or very difficult for the vehicle to travel. On the other hand, if the braking cancellation device has been put into its braking cancelable state by the braking cancellation lock device, it becomes possible or easy for the vehicle to travel through cancellation of the parking brake. The cancellation of the parking brake may be carried out either by the driver or automatically in response to fulfillment of a braking-cancellation condition. In the latter case, the frictional member may be moved towards or away from the rotating body through operation of either an electric actuator or an electro-hydraulic control device.

As described above, the second lock device includes at least one of the transmission lock device, the steering lock device and the braking cancellation lock device. However, if the second lock device includes at least one of the transmission lock device and the braking cancellation lock device and does not include the steering lock device, it becomes possible to enlarge the space in the vicinity of the steering member. It also becomes possible to enlarge the space in the moving object.

An anti-theft system for a moving object according to a third aspect of the invention includes a plurality of lock devices, a plurality of collators and a lock-device controller. The plurality of lock devices are included in the moving object and can be switched between a locked state where operation of a plurality of components required to move the moving object is prohibited, and an unlocked state where operation of the components is permitted. The plurality of collators are provided so as to correspond to the lock devices respectively and collate identifying informations of the moving object and a portable object. The lock-device controller separately controls, based on collation results of the collators, lock devices corresponding thereto.

If the identifying informations do not coincide with each other in a collator, the lock device corresponding thereto is maintained in its locked state. If the informations coincide with each other in a collator, the lock device corresponding thereto is maintained in its unlocked state. Also in this case, if the identifying informations do not coincide with each other in at least one of the collators, there is no possibility of all the lock devices being unlocked. It is possible to reinforce security in comparison with the case where a plurality of lock devices are unlocked if the identifying informations coincide with each other in only one of the collators.

It is desirable that a collator be provided so as to correspond to each lock device. One of the collators so provided as to correspond to a lock device may also serve as the lock-device controller. This is because both the lock-device controller and the collators are constructed mainly of computers.

An anti-theft system for a moving object according to a fourth aspect of the invention includes a lock device and a controller. The lock device is included in the moving object and can be switched between a locked state where operation of a component required to move the moving object is prohibited, and an unlocked state where operation of the device is permitted. The controller controls the lock device based on collation results of identifying informations in the moving object and a portable object.

BRIEF DESCRIPTION OF THE DRAWINGS

The foregoing and other objects, aspects, features and advantages of the invention will become apparent from the following description of preferred embodiments with reference to the accompanying drawings in which like reference numerals designate like elements and wherein:

FIG. 7 is a schematic view of an entire vehicular anti-theft system according to another embodiment of the invention.

DETAILED DESCRIPTION OF PREFERRED EMBODIMENTS

Hereinafter, an anti-theft system for a moving object according to embodiments of the invention will be described in detail with reference to the drawings. The anti-theft system is a vehicular anti-theft system for preventing theft of a moving object such as a vehicle.

Figure 1:
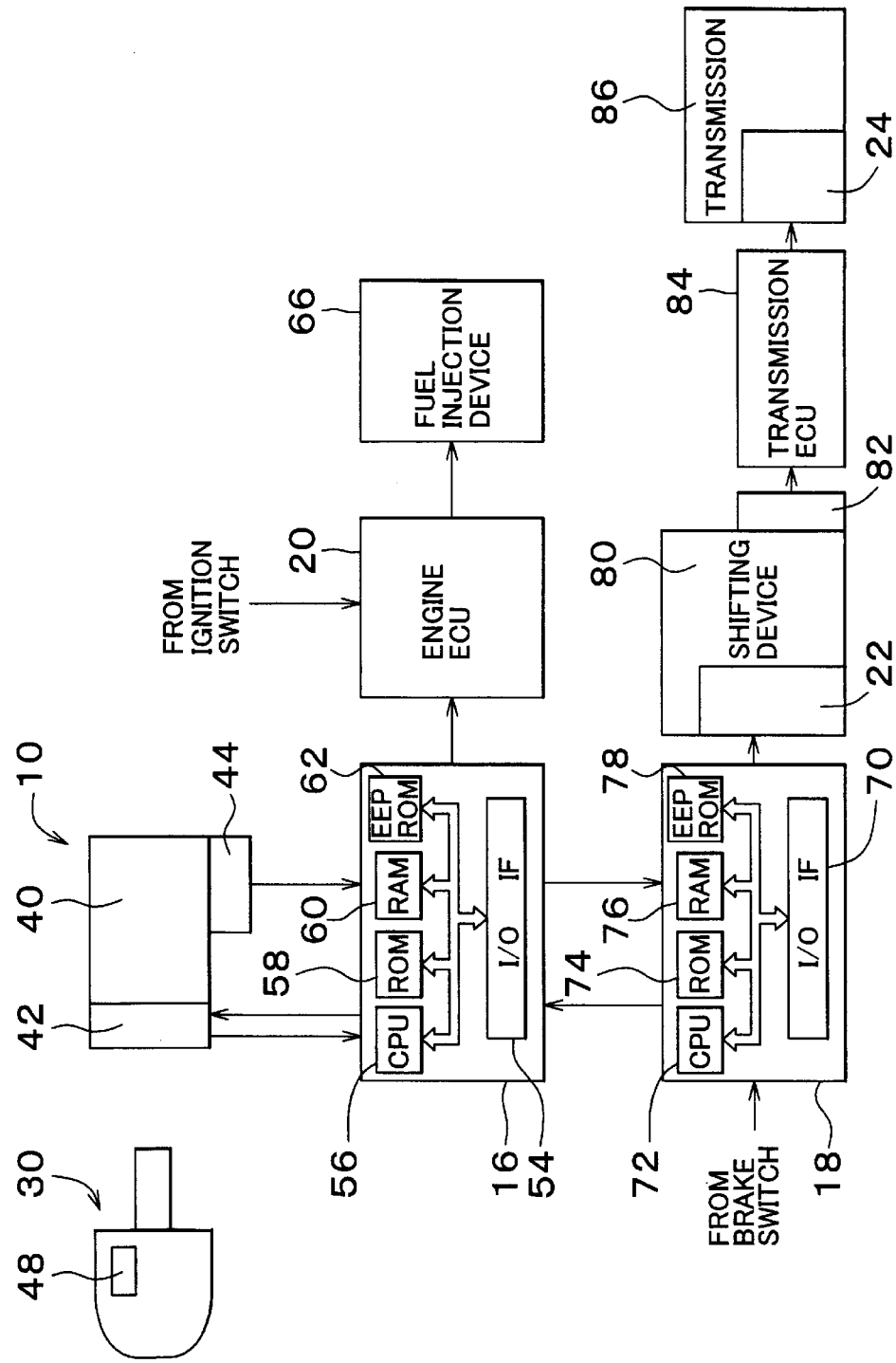
FIG. 1 is a schematic view of an entire vehicular anti-theft system according to one embodiment of the invention.

As shown in FIG. 1, a vehicular anti-theft system includes a key cylinder device 10, an immobilizer ECU (Electronic Control Unit) 16, a shift ECU 18, an engine ECU 20, a shift lock device 22 and a parking device 24. The immobilizer ECU 16 and the shift ECU 18 serve as collators, and the engine ECU 20, the shift lock device 22 and the parking device 24 serve as lock devices.

If a key 30 for the vehicle possessed by a qualified driver has been inserted into the key cylinder device 10, the immobilizer ECU 16 reads identifying information stored in the key 30 (key-side identifying information) while the key 30 is inserted in the key cylinder device 10. This information is collated with identifying information stored in the immobilizer ECU 16 (immobilizer-side identifying information). The key-side identifying information is supplied to the shift ECU 18 and is collated with identifying information stored in the shift ECU 18 (shift-lock-side identifying information). In this embodiment, the immobilizer-side identifying information and the shift-lock-side identifying information are identical and can generically be referred to as vehicle-side identifying information. If the key-side identifying information coincides with the immobilizer-side identifying information and if the key-side identifying information coincides with the shift-lock-side identifying information, the engine ECU 20 permits performance of fuel injection control, and the shift ECU 18 permits the unlocking of the shift lock device 22.

The key cylinder device 10 includes a cylinder portion 40, a transmitting-receiving portion 42 and a key insertion switch 44. The key 30 is inserted into the cylinder portion 40. The transmitting-receiving portion 42 communicates with the key 30 while the key 30 is inserted in the cylinder portion 40. The key insertion switch 44 detects whether or not the key 30 has been inserted into the cylinder portion 40. The transmitting-receiving portion 42 includes an antenna coil and an amplifier. The antenna coil is excited by the immobilizer ECU 16.

A transponder 48 is embedded in the key 30. Although not shown, the transponder 48 includes a transmitting-receiving portion that communicates with an identifying information generating portion and the key cylinder device 10. If the antenna coil has been excited while the key 30 is inserted into the key cylinder device 10, the key-side identifying information is read out from the identifying information generating portion of the transponder 48. The key-side identifying information transmitted from the key 30 is input to the immobilizer ECU 16 through the transmitting-receiving portion 42 of the key cylinder device 10.

Figure 2:
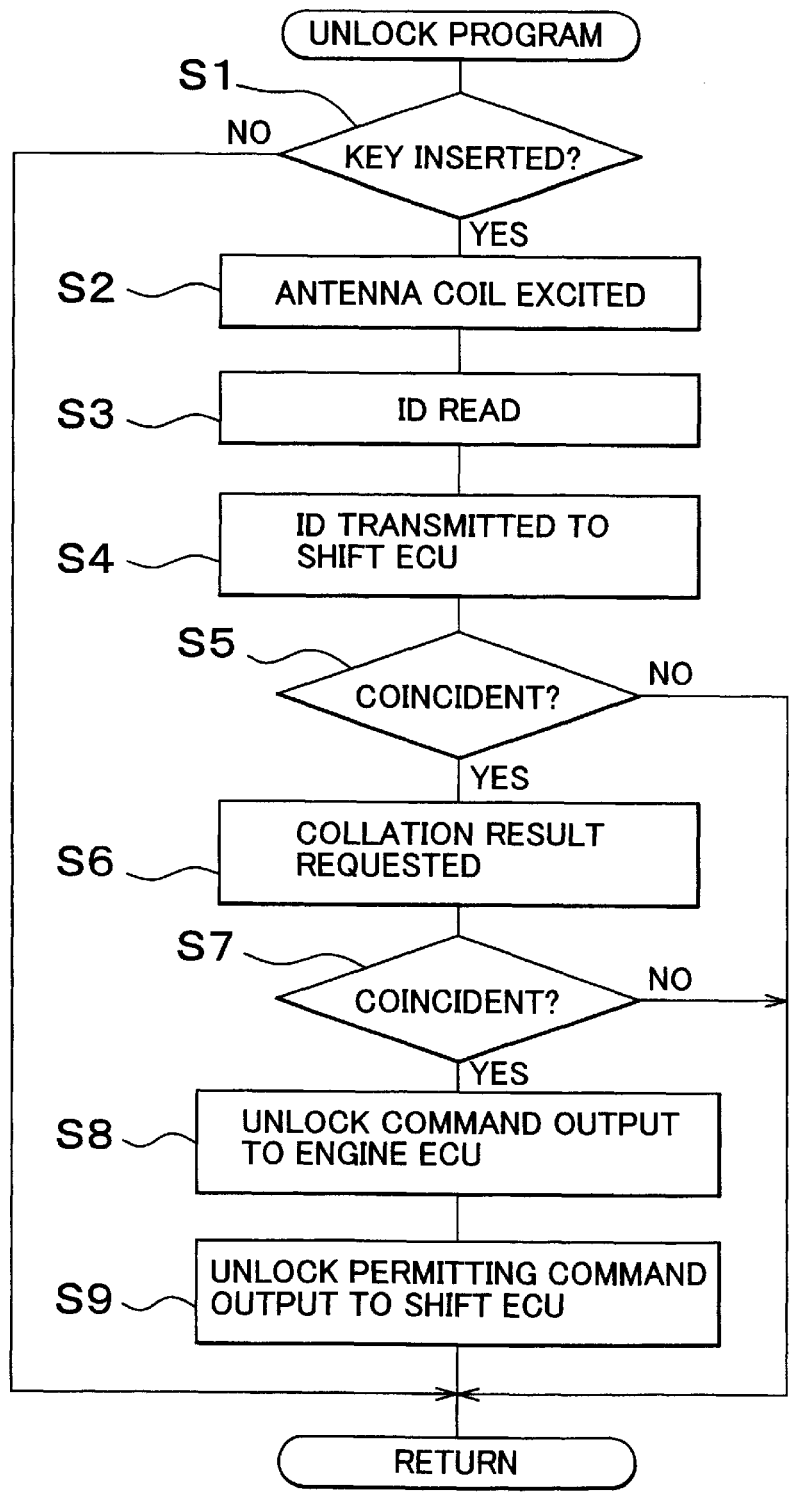
FIG. 2 is a flowchart showing an unlock program stored in a ROM of an immobilizer ECU of the vehicular anti-theft system.

The immobilizer ECU 16 is mainly constructed of a computer including an I/O portion (interface) 54, a CPU 56, a ROM 58, a RAM 60, an EEPROM 62 and the like. The key cylinder device 10 (the transmitting-receiving portion 42 and the key insertion switch 44), the engine ECU 20, the shift ECU 18 and the like are connected to the I/O portion 54. An unlock program, an identifying information collating program and the like are stored in the ROM 58. FIG. 2 is a flowchart showing the unlock program, whereas there is no flowchart for the identifying information collating program. The immobilizer-side identifying information is stored in the EEPROM 62. The immobilizer-side identifying information thus stored and the key-side identifying information transmitted from the key 30 are collated with each other (i.e., they are compared with each other).

The engine ECU 20 is also constructed mainly of a computer and connected to a fuel injection device 66. The fuel injection device 66 includes an injector for injecting fuel into a combustion chamber and the like. By controlling a state of excitation of a solenoid provided in the injector, the amount of fuel injected from the injector, the timing for injection and the like are controlled. Upon supply of an unlock command from the immobilizer ECU 16, the engine ECU 20 is switched from its locked state where performance of fuel injection control is prohibited, to its unlocked state where performance of fuel injection control is permitted. If the engine ECU 20 is in its locked state, fuel injection control is not performed. In that case, in the fuel injection device 66, no fuel is injected from the injector. Therefore, the engine is not started. If the engine ECU 20 is in its unlocked state, performance of fuel injection control is permitted. In that case, the solenoid of the fuel injection device 66 starts being excited as soon as an ignition switch is turned ON. The state of excitation of the solenoid is controlled based on predetermined conditions such as an accelerator opening degree and a vehicle speed. In this manner, the engine ECU 20 is switched between its locked state and its unlocked state, whereby operation of the fuel injection device 66 is prohibited or permitted. In this embodiment, the engine ECU 20 corresponds to a first lock device.

The shift ECU 18 is also constructed mainly of a computer including an I/O portion (interface) 70, a CPU 72, a ROM 74, a RAM 76, an EEPROM 78 and the like. If key-side identifying information has been supplied from the immobilizer ECU 16, it is judged whether the key-side identifying information coincides with shift-lock-side identifying information stored in the EEPROM 78. The result of the judgment is transmitted to the immobilizer ECU 16. If an unlock-permitting command has been supplied from the immobilizer ECU 16 to the shift ECU 18 and if a predetermined condition such as an ON-state of a brake switch is satisfied, the shift ECU 18 switches the shift lock device 22 to its unlocked state.

The shift lock device 22 is provided in a shifting device 80 and is designed to permit or prohibit the switching of the operating position (the ON-position) of a shift switch (a shifting member) from a parking position to other positions (e.g. reverse, neutral and driving positions). By exciting a solenoid, the shift switch is switched from its locked state where the switching of the operating position to positions other than the parking position is permitted, to its unlocked state where the switching is permitted. In the case where an unlock-permitting command has not been supplied from the immobilizer ECU 16 to the shift ECU 18, even if the brake switch has been turned ON, the shift lock device 22 remains in its locked state.

In this embodiment, an operating position (shift position) sensor 82 for detecting an operating position of the shifting device 80 is provided. The operating position sensor 82 is connected to a transmission ECU 84. In the transmission ECU 84, a gear shift stage is determined based on an operating position detected by the operating position sensor 82, an accelerator opening degree and the like, and solenoids and the like of a plurality of control valves included in a transmission 86 are controlled (a plurality of clutches, brakes and the like are controlled) so as to realize the gear shift stage. The transmission 86 is provided with the parking device 24, which can be switched through operation of an electric motor between its rotation-preventing state (locked state) where rotation of a driving-torque transmitting shaft is prevented and its rotation-permitting state (unlocked state) where rotation of the driving-torque transmitting shaft is permitted. The parking device 24 has, for example, a serration formed in part of the driving-torque transmitting shaft and a projection provided in the body of the transmission 86 and engageable in a groove of the serration. The parking device 24 can be designed to include a parking lever and an electric motor. The parking lever is movable between its rotation-preventing position where the projection is engaged in the groove and its rotation-permitting position where the projection is out of the groove to permit rotation of the driving-torque transmitting shaft. The electric motor moves the parking lever between its locked position and its unlocked position. If the operating position of the shifting device 80 is the parking position, the parking lever is maintained in its rotation-preventing position. If the operating position has been switched to another position, the parking lever is moved to its rotation-permitting position through operation of the electric motor. The operating state of the electric motor is controlled based on a command from the transmission ECU 84.

In this embodiment, both the shift lock device 22 and the parking device 24 can be regarded as a transmission lock device. This is because transmission of a driving torque in the transmission 86 is prohibited regardless of whether the shift lock device 22 has been locked or the parking device 24 has been locked. It is also possible to regard both the shift lock device 22 and the parking device 24 as constituting the transmission lock device. In this embodiment, the transmission lock device is a second lock device.

Operation of the vehicular anti-theft system thus constructed will be described.

The immobilizer ECU 16 performs the unlock program shown in the flowchart of FIG. 2.

In STEP 1 (STEP 1 will hereinafter be referred to simply as S1; the same holds true for other STEPS), the key insertion switch 44 judges whether a key-undetected state has been switched to a key-detected state. If the key 30 has been detected, the judgment results in YES. Then the antenna coil of the key cylinder device 10 is excited in S2, and an identifying information transmitted from the transponder 48 is read in S3. Then the identifying information is transmitted to the shift ECU 18 in S4, and it is judged in S5 whether the identifying information coincides with the immobilizer-side identifying information (which is stored in the EEPROM 62 of the immobilizer ECU 16).

If both informations coincide with each other, a command requesting an information on a collation result is transmitted to the shift ECU 18 in S6, and it is judged in S7 whether or not the information on the collation result transmitted from the shift ECU 18 is a coincident information indicative of coincidence of identifying informations (i.e., whether the key-side identifying information coincides with the shift-lock-side identifying information stored in EEPROM 78). If the information on the collation result is the coincident information, an unlock command is output to the engine ECU 20 in S8, and an unlock-permitting command is output to the shift ECU 18 in S9.

On the other hand, if the identifying informations do not coincide with each other in at least one of the immobilizer ECU 16 and the shift ECU 18, S8 and S9 are not performed.

The engine ECU 20 remains in its locked state where performance of fuel injection control is prohibited. The shift lock device 22 is maintained in its locked state where the operation of switching the parking position to another position is prohibited.

In this manner, if the identifying informations do not coincide with each other in at least one of the immobilizer ECU 16 and the shift ECU 18, operation of the engine is prohibited and operation in the transmission 86 is prohibited. Therefore, it becomes very difficult to move the vehicle and it becomes possible to reinforce security. Even in the case where both the key cylinder device 10 and the immobilizer ECU 16 have been replaced, since identifying informations do not coincide with each other in the shift ECU 18, both fuel injection control and shift operation remain prohibited. In addition, if there is no steering lock device provided, the space around a steering wheel can advantageously be widened. As described above, in this embodiment, the immobilizer ECU 16 constitutes a lock-device controller.

In the aforementioned embodiment, the immobilizer ECU 16 constitutes the lock-device controller. However, the lock-device controller may be constituted by the shift ECU 18 or by a controller constructed mainly of a computer other than the immobilizer ECU 16 and the shift ECU 18.

In the aforementioned embodiment, the key-side identifying information is supplied from the immobilizer ECU 16 to the shift ECU 18. However, the key-side identifying information may be supplied directly to the shift ECU 18 through the key cylinder device 10. For example, the transmitting-receiving portion 42 of the key cylinder device 10 may be connected directly to the I/O portion 70 of the shift ECU 18 through a signal line.

Furthermore, the shift-lock-side identifying information may be supplied from the shift ECU 18 to the immobilizer ECU 16 so that the key-side identifying information can be collated with the shift-lock-side identifying information in the immobilizer ECU 18. In this case, an unlock-permitting command and an unlock-prohibiting command are supplied from the immobilizer ECU 16 to the shift ECU 18. In this embodiment, the immobilizer ECU 16 constitutes one of the collators, and the CPU 56 and the like of the immobilizer ECU 16 and the EEPROM 78 and the like of the shift ECU 18 constitute the other collator.

In the aforementioned embodiment, the key-side identifying information is read if the key 30 has been inserted into the cylinder portion 40. However, the key-side identifying information may be read if the key 30 has been inserted and rotated, that is, if the ignition switch has been turned ON.

In addition, an unlock command may be output to the engine ECU 20 if identifying informations coincide with each other in the immobilizer ECU 16, and the shift unlock may be permitted if identifying informations coincide with each other in the shift ECU 18. In this embodiment, if the immobilizer ECU 16 and the key cylinder device 10 have been removed and replaced by other ones, performance of fuel injection control is permitted. However, since operation of the transmission 86 remains prohibited (rotation of the driving-torque transmitting shaft is prevented), it becomes difficult to move the vehicle and it becomes possible to reinforce security.

Furthermore, it is judged in the shift ECU 18 whether or not the shift lock device 22 is abnormal. If the shift lock device 22 is abnormal, an abnormality information indicative of the abnormality of the shift lock device 22 may be supplied to the immobilizer ECU 16. If the abnormality information has been supplied to the immobilizer ECU 16, an unlock command may be prevented from being output to the engine ECU 20.

In this embodiment, if the operating state of the transmission 86 does not correspond to the operating position of the shifting device 80, or if a connecting portion between the shift ECU 18 and the shift lock device 22 has been cut, or if a signal of a normally unobtainable level has been input to the transmission ECU 84 or to the shift ECU 18, it is judged that the shift lock device 22 is out of normal operation, namely, that the shift lock device 22 is abnormal. For example, it is judged that the shift lock device 22 is abnormal if the gear shift stage in the transmission 86 (the state of clutches and brakes) is not in a state corresponding to parking despite the state where the operating position of the shifting device 80 is the parking position.

Figure 3:
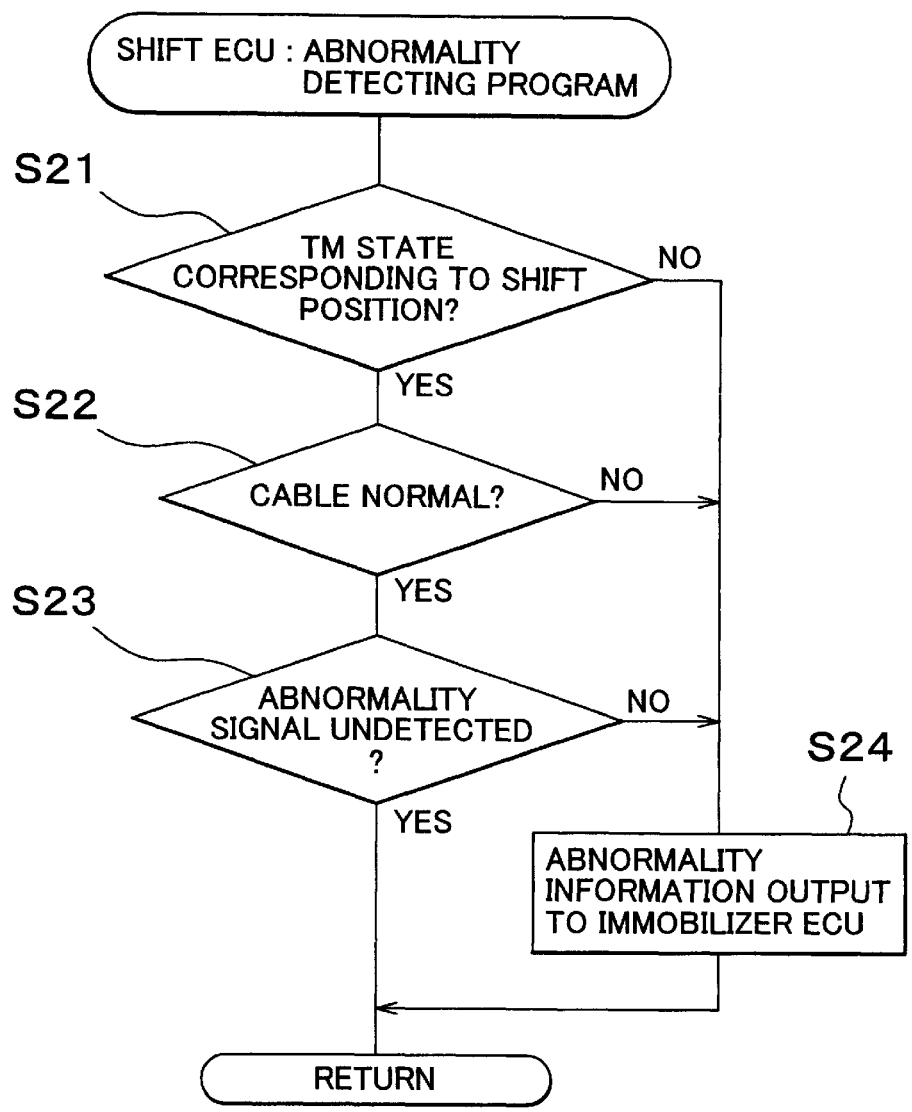
FIG. 3 is a flowchart showing an abnormality detecting program stored in a ROM of a shift ECU of a vehicular anti-theft system according to another embodiment of the invention.

In the shift ECU 18, an abnormality detecting program shown in FIG. 3 is repeatedly performed. In S21 through S23, it is judged whether or not the operating state of the transmission 86 corresponds to the operating position of the shifting device 80, whether or not the signal line between the shift ECU 18 and the shifting device 80 is normal, and whether or not there is an abnormality signal. If the judgment results in NO in one of S21 through S23, it is judged that the shift lock device 22 is abnormal, and an abnormality information is supplied to the immobilizer ECU 16 in S24.

If the abnormality information has been supplied to the immobilizer ECU 16, an unlock command is not output to the engine ECU 20, and the engine is not started. Even if the shift-lock device 22 and the parking device 24 have forcibly been unlocked, it is difficult to move the vehicle and it is possible to reinforce security. In this embodiment, those portions of the shift ECU 18 which store and perform the flowchart shown in FIG. 3 constitute an abnormality detector.

As described above, it is judged in S21 whether or not the operating position of the shifting device 80 corresponds to the operating state of the transmission 86. However, it may be judged in S21 whether or not the operating position of the shifting device 80 corresponds to the state of the parking device 24. Based on a relation among the operating position of the shifting device 80, the control command from the transmission ECU 84, the operating state of the transmission 86, the state of the parking device 24 and the like, it is possible to detect whether or not the shift lock device 22 is normal.

Figure 4:
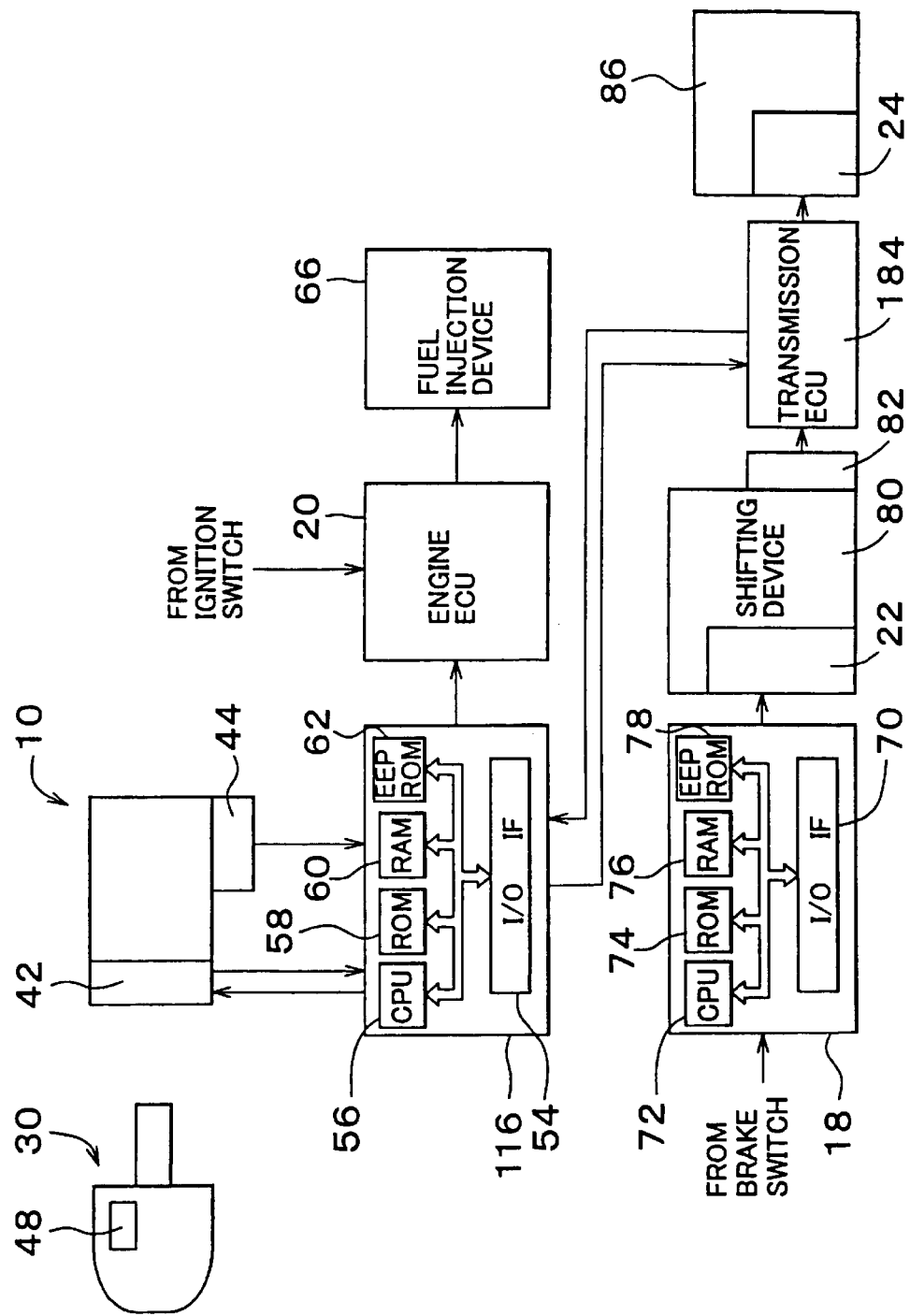
FIG. 4 is a schematic view of an entire vehicular anti-theft system according to another embodiment of the invention.

In the aforementioned embodiment, one of the collators is the shift ECU 18. However, as shown in FIG. 4, the transmission ECU 184 may be one of the collators. In this case, it is judged in the transmission ECU 184 whether or not the key-side identifying information coincides with the transmission-side identifying information. If the identifying informations coincide with each other in both the immobilizer ECU 116 and the transmission ECU 184, the immobilizer ECU 116 supplies an unlock-permitting command to the transmission ECU 184. If it is detected that the operating position of the shifting device 80 has been switched to a position other than the parking position, the transmission ECU 184 puts the electric motor of the parking device 24 into operation. The parking device 24 is unlocked, and rotation of the driving-torque transmitting shaft is permitted in the transmission 86. If the identifying informations do not coincide with each other in at least one of the immobilizer ECU 116 and the transmission ECU 184, no unlock-permitting command is supplied to the transmission ECU 184. The transmission ECU 184 is maintained in its control prohibiting state where operation control of the electric motor of the parking device 24 is prohibited. Even if the operating position of the shifting device 80 has been switched to a position other than the parking position, the electric motor is not put into operation, and the parking device 24 remains in its locked state (rotation-preventing state). Regardless of the shift position of the shifting device 80, the parking device 24 is maintained in its rotation-preventing state. As a result, even if the shift lock device 22 has been forcibly switched to its unlocked state and the operating position has been switched to a position other than the parking position, it is possible to prevent rotation of the driving-torque transmitting shaft of the transmission 86, and it is possible to reinforce security.

Moreover, the invention can also be applied to a system wherein the shifting device is mechanically coupled to the parking device 24. In this case, the shifting device includes a shift lever as a shifting member, and the shift lever is connected to the parking lever of the parking device 24 through a coupling mechanism.

If the shift lever has been shifted from the parking position to another position, the parking lever is moved from its engagement position to its disengagement position. The parking device 24 is unlocked, and rotation of the driving-torque transmitting shaft of the transmission 86 is permitted. In this embodiment, as is the case with the aforementioned embodiment, if the identifying informations do not coincide with each other in both the immobilizer ECU 16 and the shift ECU 18, the shift lock device 22 is locked, and the shifting of the shift lever from the parking position to another position is prohibited.

In this embodiment, the parking lever of the parking device 24 is moved through the shifting of the shift lever, so that the parking device 24 is switched from its locked state to its unlocked state.

Figure 5:
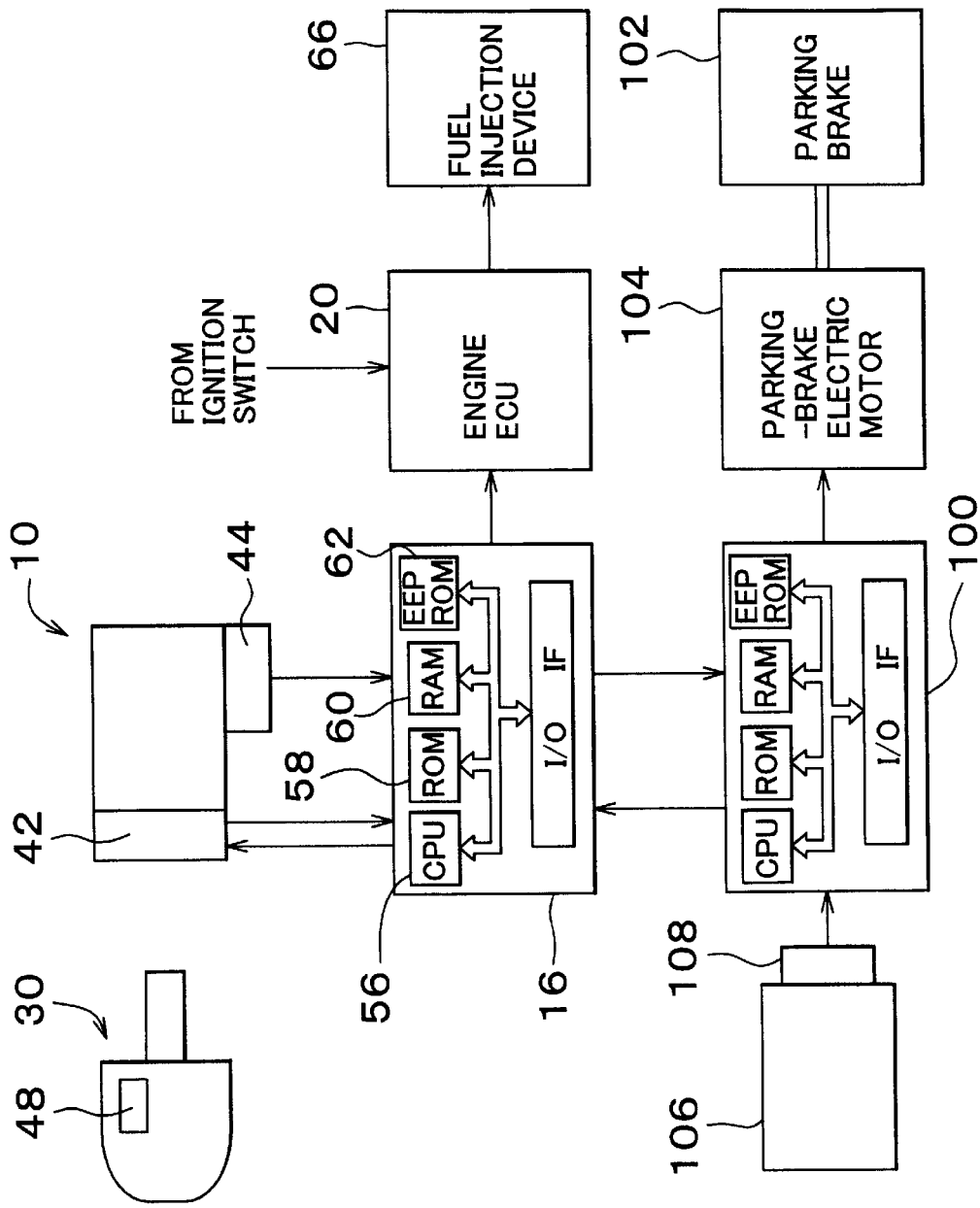
FIG. 5 is a schematic view of an entire vehicular anti-theft system according to another embodiment of the invention.

In the aforementioned embodiments, the transmission lock device is the second lock device. However, a braking cancellation lock device may be the second lock device. An example of this case will be described with reference to FIG. 5.

In this embodiment, a brake ECU 100 is connected to the immobilizer ECU 16, and the identifying informations are collated with each other in both the immobilizer ECU 16 and in the brake ECU 100. If the identifying informations coincide with each other in both ECUs, a braking-cancellation permitting command is output from the immobilizer ECU 16 to the brake ECU 100. If the identifying informations do not coincide with each other in at least one of the ECUs, no braking-cancellation permitting command is output.

A parking-brake electric motor 104 and a brake-operation-state sensor 108 are connected to the brake ECU 100. The parking-brake electric motor 104 switches the parking brake 102 between its operative state and its inoperative state. The brake-operation-state sensor 108 detects an operation state of a parking brake operating member 106. The parking brake 102 restrains rotation of wheels by pressing a frictional member incapable of rotating relative to a vehicle body against a rotating body that rotates with the wheels. Through operation of the parking-brake electric motor 104, a pressing force for pressing the frictional member against the rotating body is applied to the frictional member or removed therefrom.

If the brake-operation-state sensor 108 detects that the parking brake operating member 106 has been switched from its inoperative state to its operative state, the parking-brake electric motor 104 is rotated normally. A pressing force is applied to the frictional member so that a braking state is realized.

If it is detected that the parking brake operating member 106 has been switched from its operative state to its inoperative state, the parking-brake electric motor 104 is rotated reversely. The pressing force is reduced to zero so that a braking-cancellation state is realized.

In this embodiment, if an unlock-permitting command has been supplied from the immobilizer ECU 16, the brake ECU 100 assumes its braking-cancellation permitting state. The switching of the parking brake 102 to its braking-cancellation state is permitted. If it is detected that operation of the parking brake operating member 106 has been cancelled, braking-cancellation control is performed to reversely rotate the parking-brake electric motor 104. Operation of the parking brake 102 is cancelled, which makes it easy for the vehicle to travel.

If no unlock permitting command is supplied from the immobilizer ECU 16, the braking-cancellation prohibiting state is maintained. Even if operation of the parking brake operating member 106 has been cancelled, the parking-brake electric motor 104 is prevented from rotating reversely, and the parking brake 102 is maintained in its operative state. The braking force remains applied to the vehicle, which is thus prevented from traveling. As described above, in this embodiment, the brake ECU 100 corresponds to the braking cancellation lock device.

Figure 6:
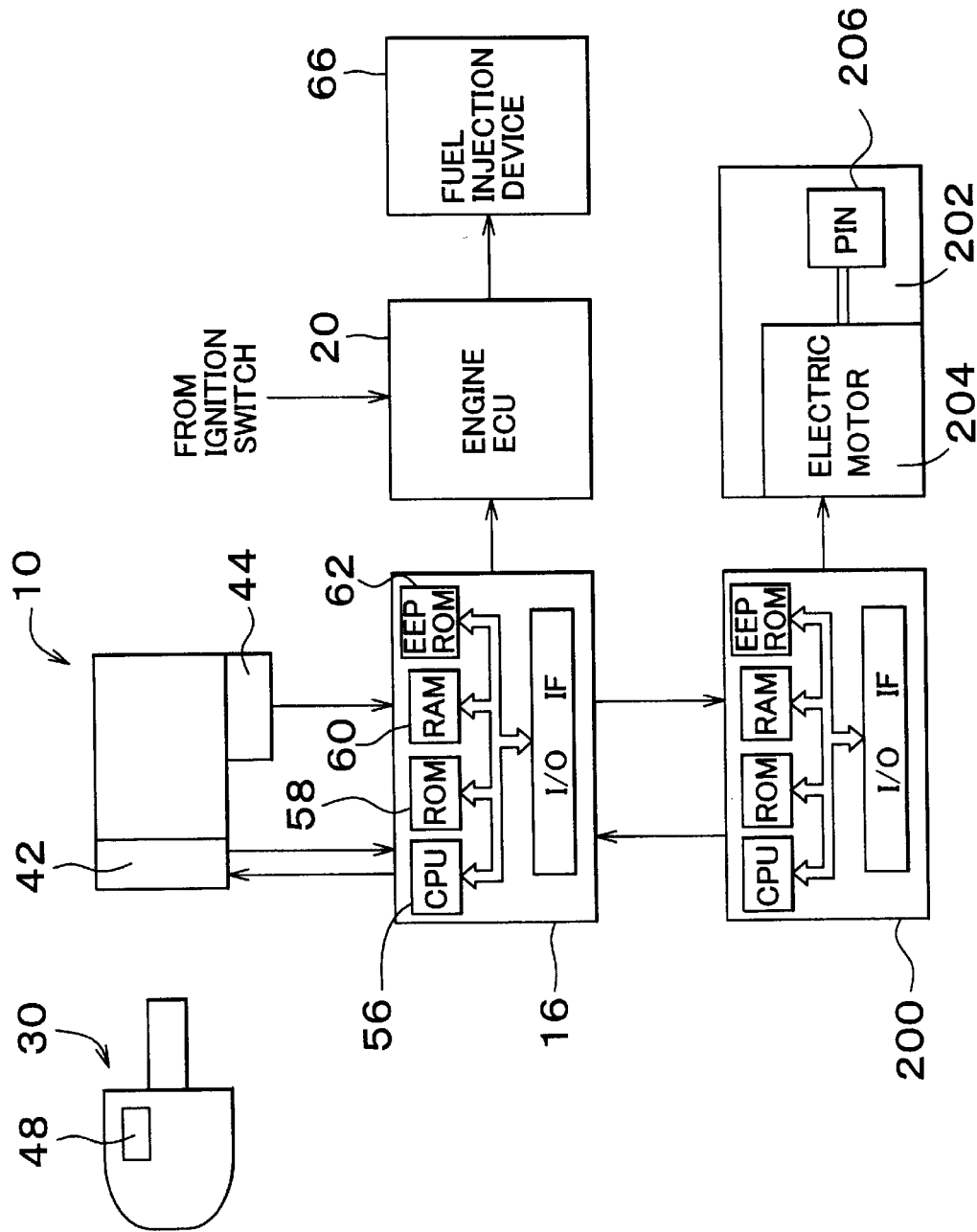
FIG. 6 is a schematic view of an entire vehicular anti-theft system according to still another embodiment of the invention.

In the aforementioned embodiment, if the identifying informations do not coincide with each other, the parking-brake electric motor 104 is prevented from being rotated reversely. However, brake-releasing operation of the parking brake operating member 106 may be prohibited instead. This embodiment is more advantageously applicable to a case where the parking brake 102 is switched between its braked state and its non-braked state through operation of the parking lever by the driver than to a case where the parking brake 102 is switched through operation of the parking-brake electric motor 104. The second lock device may be the steering lock device. An example of this case will be described with reference to FIG. 6.

In this embodiment, a steering lock ECU 200 is connected to the immobilizer ECU 16, and the identifying informations are collated with each other in the immobilizer ECU 16 and in the steering lock ECU 200. If the identifying informations coincide with each other in both the immobilizer ECU 16 and the steering lock ECU 200, an unlock command is supplied to the steering lock ECU 200 from the immobilizer ECU 16, and a steering lock device 202 is switched to its unlocked state.

For example, a steering shaft extends across the steering lock device 202. The steering lock device 202 is switched between its coupled state where a steering-wheel-side shaft and a gear-box-side shaft are coupled to each other, and its separated state where these shafts are separated from each other. When the steering lock device 202 is in its separated state, it makes the gear-box-side shaft incapable of rotating relative to a vehicle-body-side member (a steering column). The steering lock device 202 includes a steering-lock-device electric motor 204 and a pin 206. The pin 206 is movable between its operative position and its inoperative position through operation of the steering-lock-device electric motor 204.

If the pin 206 is in its inoperative position, the wheel-side shaft is coupled to the gear-box-side shaft. The steering torque applied to the steering wheel is transmitted to a kinetic conversion device (e.g., the gear box) by the steering-wheel-side shaft and the gear-box-side shaft and converted into a rectilinear force, so that the wheels are turned.

If the pin 206 is moved to its operative position, the wheel-side shaft is separated from the gear-box-side shaft, which is made incapable of rotating relative to the steering column. Even if the steering wheel has rotationally been steered, the steering torque is not transmitted to the gear-box-side shaft, and the wheels are not turned in response to the steering of the steering wheel. The steering wheel is put into its free-wheel state, which is a steering-lock state. In this case, since the gear-box-side shaft is made incapable of rotating relative to the steering column, it is difficult to manually rotate only the gear-box-side shaft.

The kinetic conversion device includes, for example, a pinion provided at the end of the gear-box-side shaft and a rack coupled to a tie rod for turning the wheels. In this embodiment, the gear ratio between the pinion and the rack is small if the steering angle of the steering wheel is small with respect to its neutral position, and the gear ratio is great if the steering angle is great. In other words, the diameter of the pitch circle of the pinion decreases as the steering angle increases. The operation amount of the steering wheel relative to the turning amount of the wheels increases as the steering angle increases. This serves to lighten the steering of the steering wheel in the case of an increase in the rotational angle. This kinetic conversion device includes a variable-gear-ratio rack-and-pinion steering gear.

In this embodiment, if no unlock command is supplied from the immobilizer ECU 16 to the steering lock ECU 200, the steering lock device 202 is maintained in its locked state. Therefore, even if the steering wheel has rotationally been operated, the wheels are prevented from rotating accordingly. Thus, it becomes very difficult to move the vehicle.

In the aforementioned embodiment, the pin 206 is movable between its coupled position and its separated position through operation of the steering-lock-device electric motor 204. However, the pin 206 may be moved through excitation of a solenoid.

The second lock device also may be the steering ECU 300. An example of this case will be described with reference to FIG. 7.

In this embodiment, the steering device includes a gear-ratio changing device 302, which is controlled based on a command from the steering ECU 300.

A steering shaft (e.g. an intermediate shaft) extends across the gear-ratio changing device 302. The ratio of the rotational angle of a kinetic-conversion-device-side portion of the steering shaft (an output-side shaft) 306 to the rotational angle of a steering-wheel-side portion of the steering shaft (an input-side shaft) 304 is variably controlled. While no current is supplied to the electric motor, it is impossible to obtain a holding torque. Therefore, the rotational torque of the input-side shaft 304 is not transmitted to the output-side shaft 306, and the input-side shaft 304 assumes its free-wheel state.

The gear-ratio changing device 302 is provided with a coupling device 308. The coupling device 308 includes a pin and a driving device for moving the pin between its operative position and its inoperative position. If the gear-ratio changing device 302 is in normal operation, the pin is in its inoperative position. However, for example, if the gear-ratio changing device 302 is in abnormal operation, the pin is moved to its operative position by the driving device, so that the input-side shaft 304 is not mechanically coupled to the output-side shaft 306. It becomes impossible to transmit a rotational torque of the input-side shaft 304 to the output-side shaft 306 through the coupling device 308.

In this embodiment, the identifying informations are collated with each other in the steering ECU 300 and in the immobilizer ECU 16. If the identifying informations do not coincide with each other in at least one of the ECUs, the steering ECU 300 is maintained in its locked state. The gear-ratio changing device 302 is in its inoperative state, while the coupling device 308 is maintained in its operative state. No current is supplied to the electric motor of the gear-ratio changing device 302, and the pin of the coupling device 308 is maintained in its operative position. Even if the steering wheel has rotationally been operated, the wheels are not turned, and it becomes difficult to move the vehicle.

In the aforementioned respective embodiments, although one of the two collators is the immobilizer ECU 16, it is not indispensable that one of the collators be the immobilizer ECU 16. Two or more of the shift ECU 18, the brake ECU 100, the steering lock ECU 200 and the steering ECU 300 may be constructed as collators.

Furthermore, in the aforementioned embodiment, the key-side identifying information is read with the key 30 inserted into the key cylinder device 10. However, it is also possible to read the information with the key 30 out of contact with the vehicle.

The vehicle may include an electric motor instead of an internal combustion engine. For example, if the identifying informations do not coincide with each other, rotation of the electric motor for driving is prevented.

Furthermore, the transmission lock device of the transmission, the steering lock device and the like are nothing more than examples. The invention can also be applied to other structures.

In the illustrated embodiment, the various controllers (the ECUs) are implemented as a programmed general purpose computers. It will be appreciated by those skilled in the art that the controllers can be implemented using single special purpose integrated circuits (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An anti-theft system for a moving object, the anti-theft system comprising:
   a plurality of lock devices that are located in the moving object and that are switchable between locked states where operation of a plurality of components of the moving object required to move the moving object is prohibited, and unlocked states where operation of the components is permitted;
   a plurality of collators corresponding in number to the plurality of lock devices respectively, each of which collates identifying information of the moving object and identifying information of a portable object;
   a lock-device controller that is separate from the plurality of collators, the lock-device controller separately controlling, based on collation results of the plurality of collators, the plurality of lock devices corresponding thereto; and
   an abnormality detector that detects an abnormality in at least one of the lock devices,
   wherein the lock-device controller maintains, if the abnormality detector has detected an abnormality, all the lock devices except the abnormal lock device in the locked states.

2. The anti-theft system according to claim 1, wherein the lock-device controller maintains all the lock devices in the locked states if the identifying informations do not coincide with each other in at least one of the collators.

3. The anti-theft system according to claim 1, wherein:
   one of the lock devices is a first lock device that can be switched between the locked state where operation of a driving source of the moving object is prohibited, and the unlocked state where operation of the driving source is permitted;
   another one of the lock devices is a second lock device that is required to move the moving object and can be switched between the locked state where operation of components other than the driving source is prohibited, and the unlocked state where operation of the components is permitted; and
   the lock-device controller maintains, if the identifying informations do not coincide with each other in at least one of the collators, both the first lock device and the second lock device in the locked states.

4. The anti-theft system according to claim 3, wherein the abnormality detector detects an abnormality in the second lock device.

5. The anti-theft system according to claim 3, wherein the second lock device includes at least one of:
   a transmission lock device that switches a driving-torque transmitting device that transmits a driving torque of the driving source of the moving object between a transmission state where the driving torque can be transmitted, and a non-transmission state where the driving torque cannot be transmitted;
   a steering lock device that switches a steering device that changes a moving direction of the moving object based on operation of a steering member by the driver between an unsteerable state where the moving direction cannot be changed based on the operation and a steerable state where the moving direction can be changed; and
   a braking cancellation lock device that switches a braking-force canceling device that cancels a braking force applied to the moving object to permit the moving of the moving object between a cancelable state where the braking force can be canceled and an uncancelable state where the braking force cannot be canceled.

6. The anti-theft system according to claim 5, wherein the moving object is a vehicle, and the transmission lock device is at least one of a shift lock device and a parking device of the vehicle.

7. The anti-theft system according to claim 5, wherein the moving object is a vehicle, and the braking cancellation lock device is a brake Electronic Control Unit of the vehicle.

8. The anti-theft system according to claim 5, wherein the steering lock device includes a steering Electronic Control Unit.

9. The anti-theft system according to claim 3, wherein the moving object is a vehicle, and the first lock device is an engine Electronic Control Unit of the vehicle.

10. The anti-theft system according to claim 1, wherein the lock-device controller is an immobilizer Electronic Control Unit.

* * * * *